United States Patent Office 2,845,382
Patented July 29, 1958

2,845,382

CYCLIC PROCESS FOR THE REMOVAL OF HYDROGEN SULFIDE FROM HIGH TEMPERATURE GASEOUS STREAMS WITHOUT REDUCTION IN TEMPERATURE

Leonard N. Leum, Media, and Paul M. Pitts, Secane, Pa., assignors to The Atlantic Refining Company, Philadelphia, Pa., a corporation of Pennsylvania No Drawing. Application April 23, 1954
Serial No. 425,312

4 Claims. (Cl. 196—28)

This invention relates to a process for the removal of hydrogen sulfide from high temperature gaseous streams, in which the hydrogen sulfide is essentially the only acidic component, by the use of a solid alkaline earth metal hydroxide, and more particularly it relates to the conversion of the spent solid in the form of the alkaline earth metal sulfide back into the alkaline earth metal hydroxide which is suitable for further removal of hydrogen sulfide from high temperature gaseous streams. Specifically, the invention relates to the conversion of alkaline earth meal sulfides produced by reaction of hydrogen sulfide with solid alkaline earth metal hydroxides back into the hydroxide compound by treating the alkaline earth metal sulfide with a solution of an alkali metal hydroxide or sulfide and an oxygen containing gas.

There are numerous processes particularly in the petroleum industry, wherein hydrogen sulfide occurs in gaseous streams. For example, in the hydrodesulfurization of petroleum distillates, the distillate is passed at elevated temperatures and pressures, and in the presence of hydrogen, over a catalyst such as the oxides or sulfides of the metals of group VI of the periodic table to decompose the sulfur compounds into hydrogen sulfide and hydrocarbons. According to present practice, the high temperature, high pressure effluent stream containing hydrogen, hydrogen sulfide, and hydrocarbons is cooled to condense the liquefiable constituents, the liquid phase is separated from the gas phase which contains hydrogen, hydrogen sulfide, and methane, the pressure on the liquid is reduced to atmospheric whereby additional amounts of hydrogen, hydrogen sulfide and light hydrocarbons are flashed overhead, leaving a stabilized essentially sulfur-free product containing only small amounts of dissolved hydrogen sulfide. The distillate then is washed to remove the remaining hydrogen sulfide and, if additional processing is required, it is revaporized and sent to cracking, reforming or similar processes.

In recent years, catalytic reforming processes have come into wide-spread use in the petroleum industry for the purpose of upgrading the octane level of straight-run naphthas. Many of these processes employ platinum-containing catalysts and operate with a net production of hydrogen. The naphtha together with recycle hydrogen is passed in the vapor phase at elevated temperatures and pressures into a reactor containing the platinum catalyst. Since the over-all reforming reaction is endothermic, the process is designed so that only a portion of the reforming operation occurs in the first reactor. The total effluent from the first reactor is then reheated to operating temperatures and passed into a similar second reactor where additional reforming occurs, the effluent from the second reactor is re-heated and then passed into the third, and ordinarily final, reactor wherein the reforming is completed. When sulfur containing fuels are being processed generally all of the hydrodesulfurization takes place in the first reactor with production of hydrogen sulfide. If the hydrogen sulfide is allowed to remain in the stream, it will depress the activity of the platinum catalyst in the second and third reactors to a greater or lesser extent depending upon the particular type of platinum catalyst. The conventional processes for removing hydrogen sulfide such as the absorption in ethanolamine solutions, require that the stream to be treated be relatively cool, generally below 200° F. Since the effluent from the first reactor is at a temperature ordinarily above 800° F. there would be a rather large heat loss in cooling it down to less than 200° F. and then re-heating to above 800° F. after the hydrogen sulfide is removed.

It is apparent that a method of removing hydrogen sulfide from high temperature, and high pressure, gaseous streams either directly from a hydrodesulfurization process or the first stage of a catalytic reforming process, would provide rather appreciable economic savings both from heat savings and simplified equipment.

In the case of the hydrodesulfurization effluent it would be desirable to remove the hydrogen sulfide from the effluent vapors prior to the condensation step, thus when the stream is cooled to condense the liquefiable constituents, a liquid phase free of dissolved hydrogen sulfide and a gaseous phase consisting of hydrogen sulfide-free hydrogen would be produced. Alternatively, the hydrogen sulfide-free effluent could be sent directly to further refining operations such as reforming, hydro-cracking and the like, without the necessity of reducing either the temperature or pressure of the effluent stream.

In the case of a multiple-stage catalytic reforming process such as one utilizing a platinum containing catalyst, it would be possible to remove the hydrogen sulfide produced in the first stage without condensing or lowering the pressure on the effluent and thus produce a hydrogen sulfide-free hydrocarbon-hydrogen stream for the succeeding stages without deviating from the process conditions.

The prior art teaches that various compounds including alkaline earth metal oxides and hydroxides can be used for removing sulfur compounds including hydrogen sulfide from hydrocarbon streams. Until the present invention, however, there was no way of regenerating such compounds in the reactor. In order to economically regenerate such compounds, it is necessary that they be regenerated in the reactor for the reason that the labor involved in replacement of the spent reactant would be costly and furthermore, since high pressures are involved, large high pressure closures on the equipment would be necessary on which it is difficult to maintain non-leaking seals, particularly if they are opened frequently.

It is a broad object of this invention, therefore, to provide a practical method for producing a hydrogen sulfide-free gas stream either between a hydrodesulfurization step and a succeeding refining step, or between successive stages in a catalytic reforming process.

It is a further object of the present invention to provide a method of regenerating spent alkaline earth metal hydroxides without removing such compounds from the equipment in which they are used.

It is a particular object of this invention to produce the alkaline earth metal hydroxide from the reaction of the corresponding sulfide with an aqueous solution of an alkali metal hydroxide or sulfide and an oxygen-containing gas. Further objects of the instant invention will be apparent from the following description.

According to the invention the high temperature gaseous stream from a catalytic hydrodesulfurization process or the first stage of a catalytic reforming process, is passed over a bed of an alkaline earth metal hydroxide such as calcium hydroxide. The hydrogen sulfide contained in the gaseous stream reacts with the alkaline earth metal hydroxide to produce the corresponding alkaline earth metal sulfide and water. The water passes along the withdrawn stream in the form of steam. After the bed of alkaline earth metal hydroxide is converted to the sulfide, the gaseous stream from the hydrodesulfurization step or catalytic reforming step is diverted to a second reactor containing a bed of fresh alkaline earth metal hydroxide. The first bed of alkaline earth metal sulfide is then regenerated in place.

According to the invention, the regeneration is accomplished by treating the sulfide with an alkali metal hydroxide or sulfide in an aqueous solution while at the same time introducing an oxygen containing gas into the solution in contact with the sulfide. This may be done at the pressure of the system thereby eliminating the need for depressuring and repressuring the chamber containing the alkaline earth metal compound. Since the pressure of the hydrodesulfurization or catalytic reforming reaction may range between 50 and 1000 pounds per square inch, generally from 100 to 700 pounds per square inch, the regeneration may be carried out conveniently in these pressure ranges, however, it is entirely within the scope of the invention to regenerate at atmospheric pressures. The temperature at which the regeneration is carried out ranges from a few degrees below the boiling point of the aqueous solution to the boiling point at the pressure employed. In other words, the regeneration is carried out in the liquid phase. If sodium hydroxide is utilized as the alkali metal compound for regeneration, the reaction will be the production of the corresponding alkaline earth metal hydroxide and sodium sulfide which in the presence of the oxygen-containing-gas is converted to the polysulfide. Following the complete conversion of the alkaline earth metal sulfide back into the hydroxide the aqueous solution is separated by any suitable means from the alkaline earth metal hydroxide pellets and the pellets are brought back up to reaction temperature with high temperature steam or similar inert gas which likewise acts as a purge for the system. The high temperature gaseous stream containing sulfur compounds is then readmitted to the regenerated pellets.

The temperature at which the removal of hydrogen sulfide with the alkaline earth metal hydroxide is most nearly quantitative ranges from 600° F. to about 1000° F. The action of the alkaline earth metal hydroxide is independent of the hydrocarbons in the gaseous stream, its sole reaction being with the hydrogen sulfide contained therein. Since one mole of alkaline earth metal hydroxide reacts with one mole of hydrogen sulfide, the length of time required for the bed to become spent is a function of the amount of each reactant. The need for regeneration can easily be recognized by making a periodic routine examination for hydrogen sulfide in the effluent stream from the hydroxide chamber. Suitable alkaline earth metal hydroxides include calcium, strontium, and barium hydroxides with calcium hydroxide being the most preferable.

The concentration of the alkali metal hydroxide or sulfide solution used for regeneration may vary between 0.1% and 50%. However, solutions between 1.0% to 20% are preferable. Ordinarily, the length of time required for treating with an alkali metal hydroxide or sulfide and air will be from 4 to 12 hours. However, this time will very somewhat depending upon how well the solution is brought into contact with the pellets, the rate that the oxygen containing gas is introduced and the temperature of treating. The preferred alkali metals are sodium and potassium. The rate at which the oxygen-containing gas is introduced into the system can be varied over wide limits, the only theoretical requirement for the lower limit being that sufficient oxygen be introduced during the time of regeneration to convert the alkali metal sulfide to the polysulfide since by this means the most efficient use can be made of the alkali metal hydroxide. Generally, if air is used, from 10 standard liters to 300 standard liters of air per mole of alkali metal hydroxide are most effective. On the basis of oxygen, from 20 standard liters to 60 standard liters of oxygen per mole of alkali metal hydroxide are optimum. The upper limit of the gas rate is determined by the physical system since at extremely high rates, contact between the liquid and solid phases will be markedly decreased with loss of efficiency of regeneration.

The following examples are included to show the efficiency and usefulness of the instant invention and not to be construed as limiting the scope thereof.

EXAMPLE I

A bed containing $3/16$ inch diameter by $1/8$ inch thick calcium sulfide pellets was produced by contacting calcium hydroxide pellets with a high temperature (900° F.) hydrocarbon and hydrogen stream containing a small amount of hydrogen sulfide until the calcium hydroxide was completely converted to the sulfide.

These pellets were then divided into several 25 gram portions and various aqueous solutions with varying rates of air were passed through the pellets for a four-hour period. The results are presented in Table I:

*Table I*

| Solution | Volume (ml.) | Total Air (l.) | Percent Sulfur Removed |
|---|---|---|---|
| Water | 656 | 24 | 88 |
| 1% NaOH | 680 | 23 | 34 |
| 10% NaOH | 675 | 24 | 66 |
| 20% NaOH | 180 | 240 | 85 |
| 14% $Na_2S$* | 235 | 73 | 55 |

* For two hours only.

These data were obtained on the basis of constant time for comparative purposes and not for the purpose of obtaining complete regeneration. They show that at the higher concentrations and air rates the regeneration is accomplished more rapidly. Thus, it is possible to regulate the regeneration period as desired.

The data also indicate that water can be used for regeneration of the calcium hydroxide. When water is reacted with calcium sulfide, however, the reaction is between two moles of water and two moles of calcium sulfide to produce one mole of calcium hydroxide and one mole of soluble calcium hydrosulfide. Thus, with each regeneration, one-half the alkaline earth metal compound is lost and in fact after one regeneration the pellets disintegrate and become worthless for removal of hydrogen sulfide. In the above example, 38% by weight of the pellets was lost during the four-hour treating time. Consequently, water alone cannot be used. The presence of the alkali metal hydroxide or sulfide in the treating solution prevents completely the formation of soluble calcium hydrosulfide, producing instead only the calcium hydroxide and alkali metal polysulfides.

EXAMPLE II

A bed of calcium hydroxide was used in a series of successive reaction and regeneration cycles. In the reaction period a gas containing hydrogen sulfide was passed over the calcium hydroxide pellets at a temperature of 900° F. Following the absorption period the pellets of calcium sulfide were treated with 550 ml. of a 1 percent aqueous sodium hydroxide solution at a temperature of 200° F. and atmospheric pressure. Air was introduced at the rate of 1 liter per minute for the times noted in Table II. The results of these experiments are also set forth in Table II:

Table II

| Cycle | Reaction | | Regeneration | | Percent Regeneration |
|---|---|---|---|---|---|
| | Wt. Sulfur Reacted (gms.) | Time (hrs.) | Wt. Sulfur Removed (gms.) | Time (hrs.) | |
| 1 | 9.7 | 24 | 6.2 | 4 | 63 |
| 2 | 6.3 | 2 | 3.1 | 2 | 39 |
| 3 | 8.7 | 2 | 8.4 | 4 | 61 |

These data show that in the cyclic process the efficiency for sulfur reaction and regeneration to the hydroxide is maintained without loss. Since the amount of sulfur removed in the first cycle was greater than the stoichiometric amount of sodium hydroxide, it is apparent that in the succeeding cycles as well as in the first, sodium polysulfiide was being formed and utilized in the regeneration. Thus, the polysulfide content does not affect the efficiency of regeneration.

Any suitable arrangement of equipment may be used to promote intimate contact between the solid pellets, treating solution, and oxygen-containing gas such as baffles, perforated plates, jet dispersion and the like.

We claim:

1. A cyclic process for the removal of hydrogen sulfide from the high temperature gaseous product stream of a hydrodesulfurization process prior to the introduction of such high temperature product stream into a catalytic reforming process in which product stream the hydrogen sulfide is essentially the only acidic component followed by regeneration of the reagent used for such removal, which comprises contacting the gaseous stream at a temperature between 600° F. and 1000° F. with a solid reagent consisting essentially of pellets of an alkaline earth metal hydroxide to produce pellets of the corresponding alkaline earth metal sulfide and a hydrogen sulfide-free gaseous stream, discontinuing contacting the gaseous stream with the solid reagent, converting the pellets of alkaline earth metal sulfide back to the hydroxide by treating the sulfide formed with an oxygen-containing gas and an aqueous solution of an alkali metal compound from the group consisting of alkali metal hydroxides and alkali metal sulfides, removing the aqueous alkali metal polysulfide thus produced from the pellets of alkaline earth metal hydroxide and reintroducing the gaseous stream to the bed of solid reagent pellets.

2. A process according to claim 1, wherein the alkaline earth metal hydroxide is calcium hydroxide and the alkaline earth metal sulfide is calcium sulfide and the alkali metal compound is a sodium compound.

3. A cyclic process for the removal of hydrogen sulfide from the intermediate high temperature gaseous stream between the reactors in a multi-reactor catalytic reforming process in which hydrogen sulfide is essentially the only acidic component followed by regeneration of the reagent used for such removal, which comprises contacting the gaseous stream at a temperature between 600° F. and 1000° F. with a solid reagent consisting essentially of pellets of an alkaline earth metal hydroxide to produce pellets of the corresponding alkaline earth metal sulfide and a hydrogen sulfide-free gaseous stream, discontinuing contacting the gaseous stream with the solid reagent, converting the pellets of alkaline earth metal sulfide back to the hydroxide by treating the sulfide formed with an oxygen-containing gas and an aqueous solution of an alkali metal compound from the group consisting of alkali metal hydroxides and alkali metal sulfides, removing the aqueous alkali metal polysulfide thus produced from the pellets of alkaline earth metal hydroxide and reintroducing the gaseous stream to the bed of solid reagent pellets.

4. A process according to claim 3, wherein the alkaline earth metal hydroxide is calcium hydroxide and the alkaline earth metal sulfide is calcium sulfide and the alkali metal compound is a sodium compound.

References Cited in the file of this patent
UNITED STATES PATENTS

| | | |
|---|---|---|
| 1,779,024 | Werner | Oct. 21, 1930 |
| 2,135,879 | Shiffler | Nov. 8, 1938 |
| 2,614,066 | Cornell | Oct. 14, 1952 |
| 2,671,754 | De Rosset et al. | Mar. 9, 1954 |

OTHER REFERENCES

Mellor: "Comprehensive Treatise on Inorganic and Theoretical Chemistry," Longmans, Green and Co., N. Y. 1922–1923, vol. 2, pages 622, 625, vol. 3, page 743.

UNITED STATES PATENT OFFICE
CERTIFICATE OF CORRECTION

Patent No. 2,845,382                                            July 29, 1958

Leonard N. Leum et al.

It is hereby certified that error appears in the printed specification of the above numbered patent requiring correction and that the said Letters Patent should read as corrected below.

Column 1, line 25, for "meal" read -- metal --; column 3, line 69, for "very" read -- vary --; column 5, line 19, for "polysulfiide" read -- polysulfide --.

Signed and sealed this 28th day of October 1958.

(SEAL)

Attest:

KARL H. AXLINE
Attesting Officer

ROBERT C. WATSON
Commissioner of Patents